(12) United States Patent
Johnson et al.

(10) Patent No.: US 6,452,191 B1
(45) Date of Patent: Sep. 17, 2002

(54) MULTIPLE CELL RADIATION DETECTOR SYSTEM, AND METHOD, AND SUBMERSIBLE SONDE

(75) Inventors: Larry O. Johnson, Island Park, ID (US); Charles V. McIsaac, Idaho Falls, ID (US); Robert S. Lawrence, Shelley, ID (US); Ervin G. Grafwallner, Arco, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

(21) Appl. No.: 09/410,472

(22) Filed: Sep. 30, 1999

(51) Int. Cl.$^7$ .................................................. G01T 1/18
(52) U.S. Cl. .................................. 250/385.1; 250/269.1
(58) Field of Search .......................... 250/385.1, 269.1, 250/266; 378/89

(56) References Cited

U.S. PATENT DOCUMENTS 4,420,689 A * 12/1983 Rogers et al. ............... 250/385
4,490,609 A * 12/1984 Chevalier .................... 250/269

* cited by examiner

Primary Examiner—Constantine Hannaher
Assistant Examiner—Otilia Gabor
(74) Attorney, Agent, or Firm—Wells St John Roberts Gregory & Matkin

(57) ABSTRACT

A multiple cell radiation detector includes a central cell having a first cylindrical wall providing a stopping power less than an upper threshold; an anode wire suspended along a cylindrical axis of the central cell; a second cell having a second cylindrical wall providing a stopping power greater than a lower threshold, the second cylindrical wall being mounted coaxially outside of the first cylindrical wall; a first end cap forming a gas-tight seal at first ends of the first and second cylindrical walls; a second end cap forming a gas-tight seal at second ends of the first and second cylindrical walls; and a first group of anode wires suspended between the first and second cylindrical walls.

21 Claims, 3 Drawing Sheets

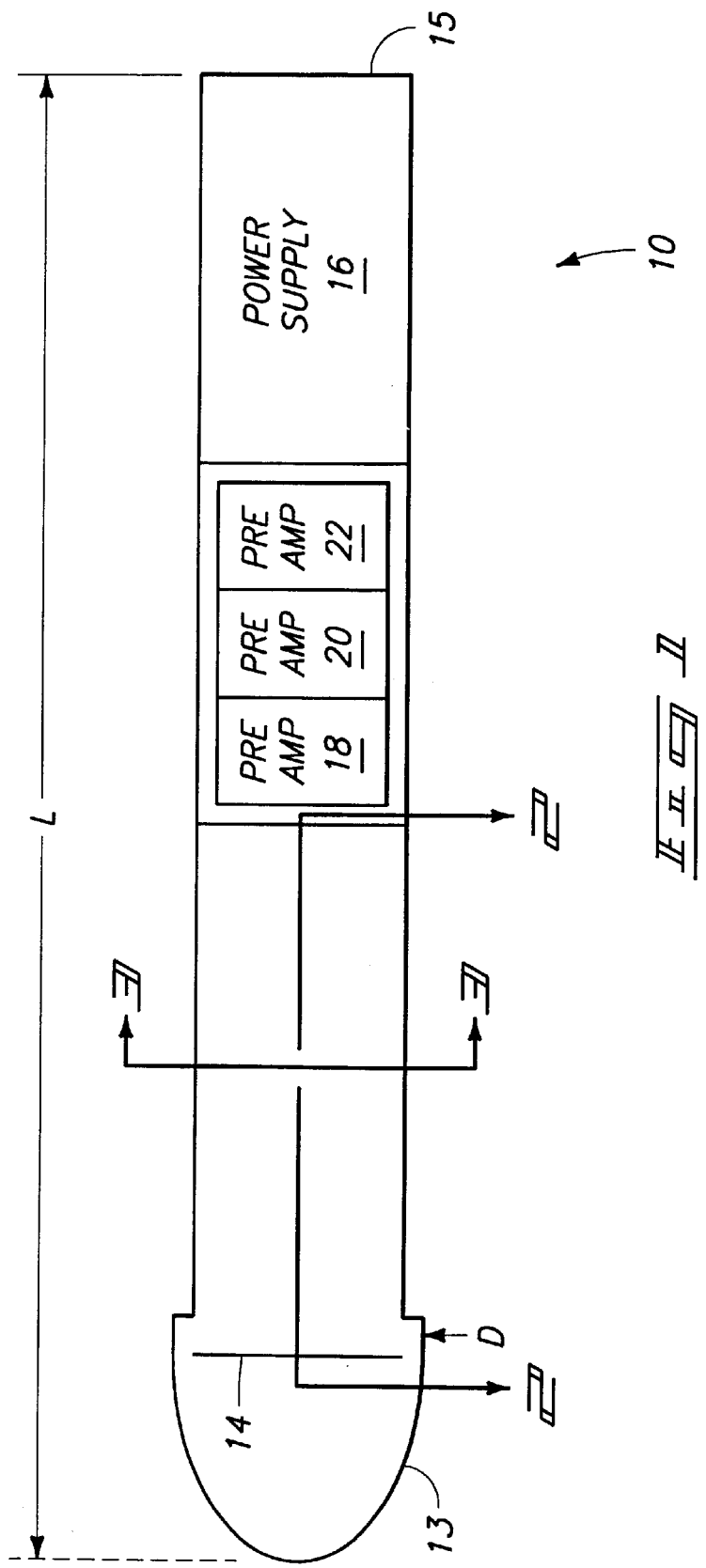

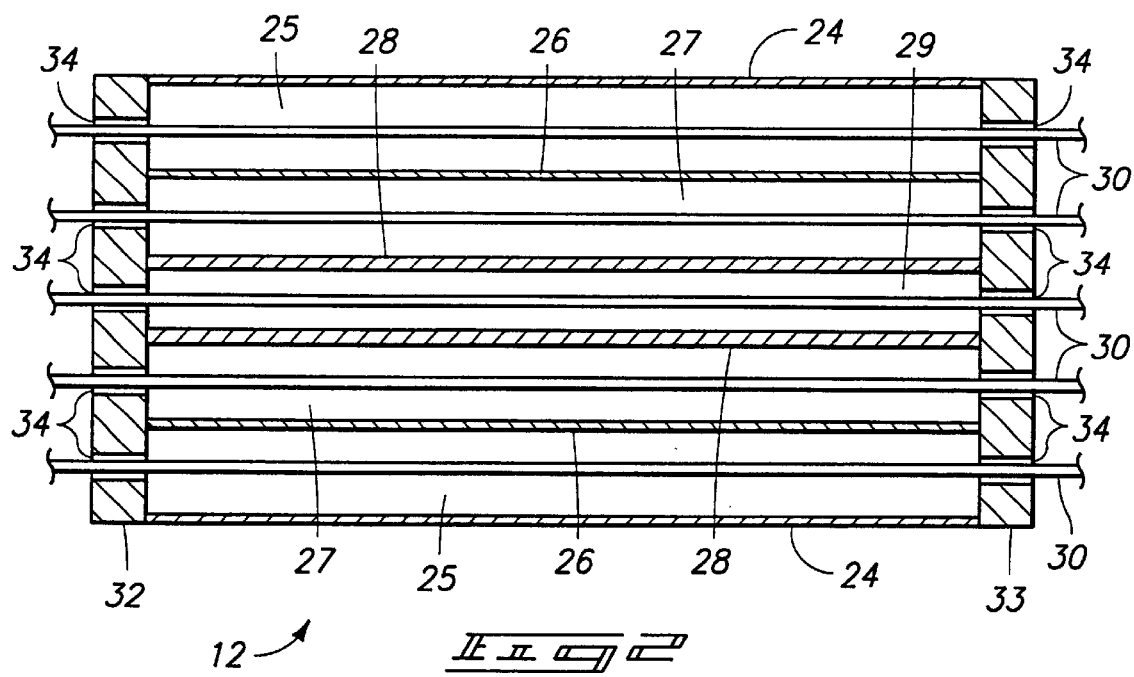
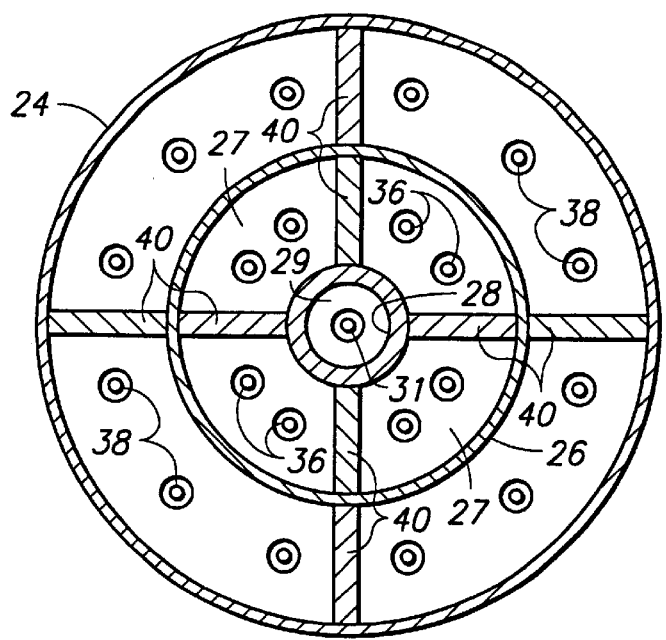

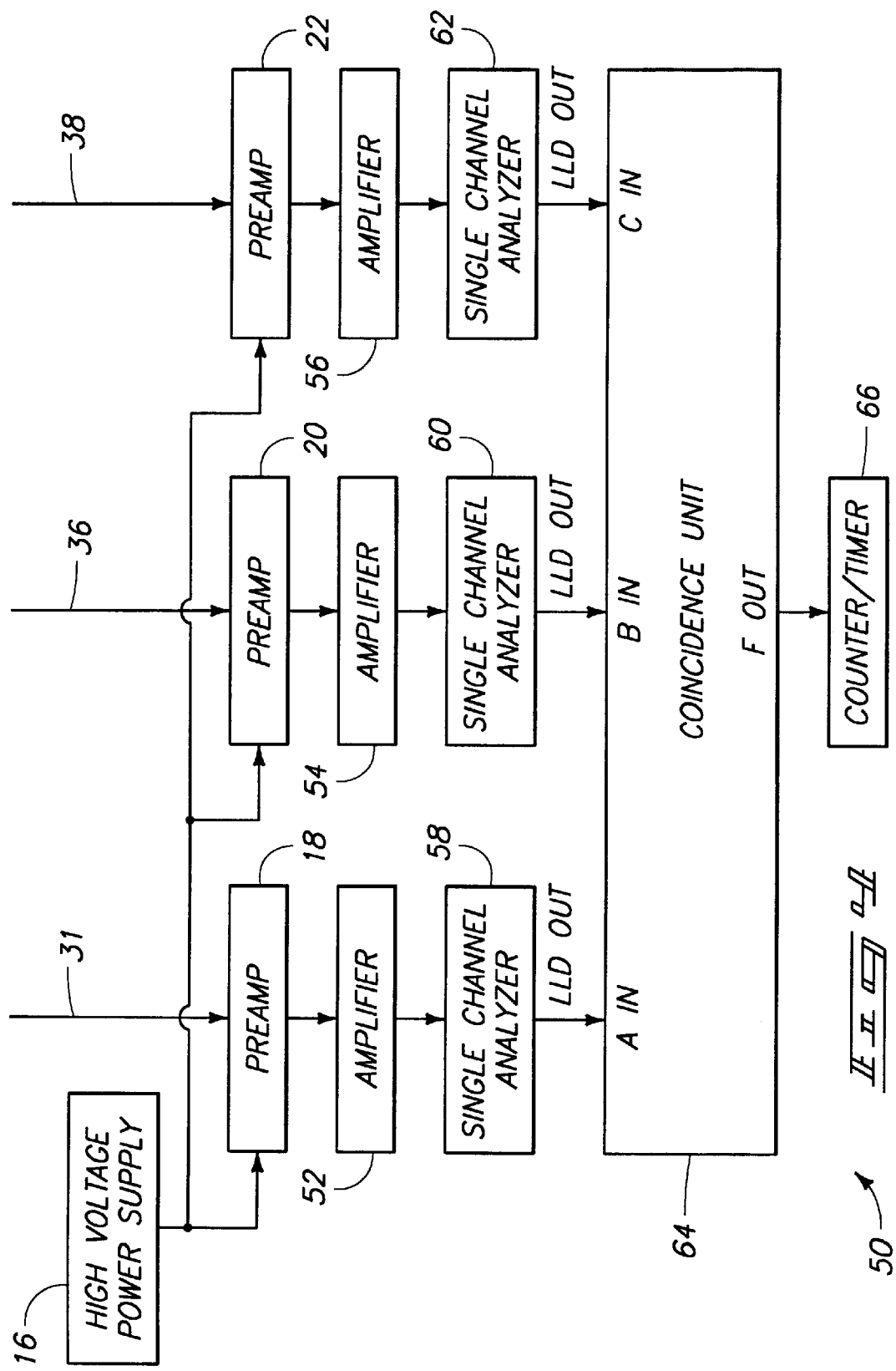

MULTIPLE CELL RADIATION DETECTOR SYSTEM, AND METHOD, AND SUBMERSIBLE SONDE

CONTRACTUAL ORIGIN OF THE INVENTION

The United States Government has rights in this invention pursuant to Contract No. DE-AC07-94ID13223 between the United States Department of Energy and Lockheed Martin Idaho Technologies Company.

TECHNICAL FIELD

The invention relates to methods of and apparatus for detecting radionuclides in boreholes, groundwater, effluent streams, soil and other scenarios. In particular aspects, the invention pertains to methods of and apparatus for discriminating between high energy particles such as cosmic rays or natural terrestrial radiation having energies greater than an upper threshold, and lower-energy radiation from decay of specific nuclides.

BACKGROUND OF THE INVENTION

In conjunction with operation of manufacturing facilities for production of medical and other radioactive materials, operation of nuclear power and breeder facilities and storage of waste products from all of these kinds of facilities, it is desirable to be able to determine the presence and concentration of certain radionuclides and to be able to discriminate between radiation from different kinds of radionuclides as well as high energy cosmic rays or natural terrestrial radiation. It is of particular interest to be able to selectively probe boreholes drilled in the vicinity of these types of facilities in order to detect presence of or track movement of these kinds of radionuclides.

Various kinds of measurement instruments and techniques have been developed for these types of assays. One conventional approach involves extracting samples of material, such as soil or groundwater, and then shipping these samples to laboratories for traditional analysis using radiochemical techniques. In the case of Sr-90, this is typically carried out using chemical separation followed by liquid scintillation counting. Disadvantages of this approach include expenses and delay between sample extraction and the availability of results. Additionally, the repeated handling of the samples by different personnel in different locations increases the possibility of error in attribution of test results to a specific test site.

Another approach relies on scintillation counting using photomultiplier tubes coupled to specialized plastic scintillation media. An instrument developed by Alan Schilk of Pacific Northwest Laboratories shows a sensitivity of about 4 picoCuries per gram of sample. Disadvantages to this approach include high instrument costs, instrument size, need for multiple photomultiplier tubes and sensitivity to environmental variables such as temperature.

It would be desirable to develop alternative methods for measurement of radioactivity, especially that due to Sr-90 and U-238. It would be particularly desirable to develop alternative and portable methods and apparatus for in situ, real-time characterization of migration of materials from buried nuclear waste, in nuclear facility effluent and within existing structures providing constricted access.

BRIEF DESCRIPTION OF THE DRAWINGS

Preferred embodiments of the invention are described below with reference to the accompanying drawings, which are briefly described below.

FIG. 1 is a simplified side view, in partial cutaway, of a sonde including a multiple cell particle detector encompassed by the present invention.

FIG. 2 is a simplified longitudinal cross section, taken along section lines 2—2 of FIG. 1, of the multiple cell particle detector of FIG. 1, in accordance with an embodiment of the present invention.

FIG. 3 is a simplified transverse cross section, taken along section lines 3—3 of FIG. 1, of the multiple cell particle detector of FIG. 1, in accordance with an embodiment of the present invention.

FIG. 4 is a simplified block diagram of electronic support circuitry adapted to operate together with the multiple cell particle detector of FIGS. 1 through 3, in accordance with an embodiment of the present invention.

SUMMARY OF THE INVENTION

In one aspect, the invention provides methods of detecting breakdown products from Sr-90 and U-238 in boreholes, groundwater, effluent streams and other scenarios. In particular aspects, the invention pertains to methods of discriminating between high energy particles such as cosmic rays or natural terrestrial radiation having energies greater than 2.3 million-electron volts (MeV) and lower-energy beta particles from decay of Sr-90 and U-238, without data corruption from particle sources providing particles having energies of less than about 700 kilo-electron volts (keV).

In another, more particular aspect, the invention encompasses a multiple cell radiation detector that includes a central cell having a first wall having a stopping power less than an upper threshold. An anode wire is suspended along an axis of the central cell. A second cell has a second wall having a stopping power greater than a lower threshold. The second wall is mounted outside of the first wall. A first end cap forms a gas-tight seal at first ends of the first and second walls, and a second end cap forms a gas-tight seal at second ends of the first and second walls. A first group of anode wires is suspended between the first and second cylindrical walls. As a result, a proportional counter is able to detect ionization events corresponding to penetration by particles having an energy greater than the lower threshold occurring within a cavity between the first and second walls and to determine when these events are contemporaneous with ionization events occurring within the central cell that correspond with penetration by particles having an energy greater than the upper threshold.

In another aspect, the invention provides a submersible sonde. The sonde has a cylindrical external housing having an outer diameter capable of fitting into a borehole and including a lower conical end cap having a point and a base. The base of the lower end cap is coupled to a first end of the cylindrical housing. The sonde also has an upper end cap including a water-tight seal for an electronic cable and an eye capable of supporting the sonde from a cable. A first compartment is formed within the housing above the first end of the housing and contains a multiple cell radiation detector having n many cells. A first cell of the detector has a first detection threshold for detection of ionizing radiation. A second cell of the detector has a second, lower detection threshold for detection of ionizing radiation. A second compartment is formed within the housing above the first compartment. The second compartment houses a high voltage power supply having a negative electrode coupled to the external housing and a positive electrode. The second compartment also houses a plurality of preamplifiers each having a high voltage input coupled to the positive electrode. A first of the preamplifiers includes a signal input coupled to an anode of the first cell and an output. A second of the preamplifiers includes a signal input coupled to an anode of the second cell and an output. Comparison of signals from the outputs of the first and second preamplifiers allows discrimination of ionizing events corresponding to particle energies between the first and second thresholds from ionizing events corresponding to particles having energies in excess of the first detection threshold.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The invention encompasses methods and apparatus for detection of certain radionuclides, even in the presence of background radiation that may be due to cosmic radiation, natural terrestrial radiation or the presence of other radionuclides. In particular embodiments, the invention encompasses real-time, in situ radionuclide assays performed at various depths in boreholes that may be carried out even in the presence of groundwater.

As will become apparent from the embodiments discussed below, several aspects of the invention provide detection of specific radionuclides associated with production of various types of nuclear materials or storage of waste from such production, such as, for example, Sr-90 and U-238.

A first aspect of the invention is described with reference to FIGS. 1 through 3, which provide various views of portions of a sonde 10 including a triple-cell particle detector 12 that may be tuned to detect ionizing radiation, such as beta particles, having energies between a lower limit and an upper limit.

FIG. 1 is a simplified side view, in partial cutaway, of the sonde 10 encompassed by the present invention. The sonde 10 is adapted to be deployed in boreholes and other constricted spaces. As such, the sonde 10 has a cylindrical shape, includes an end cap 13 coupled to a first end 14 of the sonde 10 and is adapted to have instrumentation leads and a suspension cable (not illustrated) coupled to another end 15 of the sonde 10. In one embodiment, the end cap 13 tapers to a point to facilitate lowering of the sonde 10 into an unlined borehole.

The instrumentation leads are coupled to a high voltage power supply 16 and three amplifiers 18, 20 and 22, which are respectively each coupled to separate cells of the triple-cell particle detector 12. In one embodiment, the sonde 10 has an overall length L of about 36 inches and a maximum diameter D of 3.25 inches. About twelve inches of this length L forms the triple-cell particle detector 12, although greater or lesser lengths L may be used for the triple-cell particle detector 12.

FIG. 2 is a simplified longitudinal cross section, taken along section lines 2—2 of FIG. 1, of the triple-cell particle detector 12 of FIG. 1, in accordance with an embodiment of the present invention. The triple-cell particle detector 12 includes an outer cylindrical shell 24, a space 25 within the outer shell 24 and outside of a first interior cylindrical shell 26, a space 27 within the first interior shell 26 and outside of a second interior cylindrical shell 28 and a space 29 within the second interior shell 28. Anode wires 30 extend parallel to the outer shell 24, the first interior shell 26 and the second interior shell 28. In one embodiment, the anode wires 30 are formed from stainless steel wire having a diameter of 0.0018+/−0.0005 inches and are separated from the nearest cylindrical shells, which act as cathodes, by a gap of about one centimeter.

A first end cap 32 forms a gas tight seal to one end of the outer shell 24 and a second end cap 33 forms a gas tight seal to another end of the outer shell 24. Insulating feedthroughs 34 allow electrical contact to be made to the anode wires 30 and maintain the anode wires 30 in spaced-apart relation to the outer shell 24, the first interior shell 26 and the second interior shell 28. In one embodiment, the feedthroughs 34 are formed from Teflon and brass, and the anode wires 30 are soldered to the feedthroughs 34.

The outer shell 24 and the first interior shell 26 each are formed from materials capable of partially blocking beta particle radiation and together have a combined thickness sufficient to prevent ionizing radiation, such as beta particles, having an energy of less than a first energy threshold from penetrating both the outer shell 24 and the first interior shell 26.

In one embodiment, the outer shell 24 and the first interior shell 26 act as a filter to prevent beta particles having an energy of less than about 650 to 700 keV from traveling from the exterior of the outer shell 24, through the outer shell 24 and the first interior shell 26 and into the interior 27 of the first interior shell 26. In one embodiment, the outer shell 24 and the first interior shell 26 are formed from T-6 aluminum having a thickness of 0.020 inches, each forming a filter that stops beta particles having energies of less than about 330 keV and together forming a filter that stops beta particles having energies of less than about 660 keV.

In one embodiment, the second interior shell 28 acts as a filter to prevent beta particles having an energy of greater than about 2.3 MeV from traveling through the second interior shell 28 and into the interior 29 of the second interior shell 28. In one embodiment, the second interior shell 28 is formed from T-6 aluminum having a thickness of 0.125 inch. In one embodiment, the end caps 32 and 33 are formed from T-6 aluminum having a thickness of at least 0.125 inch.

FIG. 3 is a simplified transverse cross section, taken along section lines 3—3 of FIG. 1, of the triple-cell particle detector 12 of FIG. 1, in accordance with an embodiment of the present invention. In one embodiment, one anode wire 31 extends axially along the length of and within the interior 29 of the second interior shell 28. In one embodiment, a group 36 of eight anode wires extend along the length of the space 27 between the first 26 and second 28 interior shells. In one embodiment, a group 38 of twelve anode wires extend along the length of the space 25 between the outer shell 24 and the first interior shell 26.

In one embodiment, the anode wires 30 in the group 38 are equally spaced around the first interior shell 26 and midway between the outer shell 24 and the first interior shell 26 in the space 25 formed between the outer shell 24 and the first interior shell 26. In one embodiment, the anode wires 30 in the group 36 are equally spaced around the second interior shell 28 and midway between the first interior shell 26 and the second interior shell 28 in the space 27 formed between the first interior shell 26 and the second interior shell 28. In one embodiment, spacers 40 formed from aluminum maintain the outer shell 24 and the first 26 and second 28 interior shells in spaced-apart relation and also contribute physical integrity to the exterior of the triple-cell particle detector 12.

FIG. 4 is a simplified block diagram of electronic support circuitry 50 adapted to operate together with triple-cell particle detector 12 of FIGS. 1 through 3, in accordance with an embodiment of the present invention. The electronic support circuitry 50 includes the high voltage power supply 16 and preamplifiers 18, 20 and 22 of FIG. 1, which may be contained within the sonde 10 as shown in FIG. 1. The electronic support circuitry 50 also includes amplifiers 52, 54 and 56 having inputs coupled to outputs of the preamplifiers 18, 20 and 22, respectively. Outputs of the amplifiers 52, 54 and 56 are coupled to inputs to single channel analyzers 58, 60 and 62, respectively. A coincidence circuit 64 has inputs coupled to outputs of the single channel analyzers 58, 60 and 62. Output signals from the coincidence circuit 64 may be coupled to a personal computer (not shown), data logger (not shown) or a counter/timer 66.

In one embodiment, an Ortec 659 power supply is used for the high voltage power supply 16. In another embodiment, the voltage delivered to the anode wires is changed in 100 volt steps using a low voltage control signal from a high voltage control circuit that is external to the sonde 10. In one embodiment, the preamplifiers 18, 20 and 22 are Ortec 142PC preamplifiers.

In one embodiment, the amplifiers 52, 54 and 56 are Canberra 2022 amplifiers. In one embodiment, the single channel analyzers 58, 60 and 62 are Tennelec TC451 analyzers. In one embodiment, the coincidence circuit 64 is a Tennelec TC404A coincidence circuit. In one embodiment, the counter/timer 66 is a Canberra 2071A counter/timer. In one embodiment, the amplifiers 52, 54 and 56, the single channel analyzers 58, 60 and 62, the coincidence circuit 64 and the counter/timer 66 are external to the sonde 10 and are coupled to the sonde 10 through conventional coaxial cable.

Prior to deploying the sonde 10, the spaces 25, 27 and 29 within the triple-cell particle detector 12 are filled with a detection gas that ionizes when ionizing radiation, such as beta rays, pass through it. In one embodiment, P-10 gas at atmospheric pressure fills the spaces 25, 27 and 29. P-10 gas comprises 90% argon as an ionizing agent and 10% methane as a quenching agent.

After deployment of the sonde 10, the high voltage power supply 16 is stepped from 0 volts to about 1700 volts in 100 volt steps during a period of about 28 seconds, charging all of the anode wires 30 to +1700 volts. The argon in the chambers 25, 27 and 29 ionizes when particles comprising ionizing radiation pass through the detection gas. Each ionization event produces at least one positive gas ion, e.g., Ar+, and a free electron. There may be multiple ionization events for each incidence of ionizing radiation. The free electron is accelerated toward one of the anode wires 30 that is nearest to it, and the positive gas ion is accelerated toward whichever of the outer shell 24, first interior shell 26, second interior shell 28 or end cap 32 or 34 is closest to it.

Typically, the free electron acquires sufficient kinetic energy to cause one or more secondary ionization events to occur as the free electron travels towards the anode wire 30. Each secondary ionizing event also gives rise to an Ar+ ion and a free electron. The methane acts to absorb photons emitted from neutral gas molecules that following collisions with secondary electrons are elevated to excited states rather than being ionized. The anode voltage is chosen to provide amplification of the initial ionization event without avalanche breakdown. Other combinations of noble gasses and hydrocarbons may be employed instead of P-10 gas, with higher atomic weight gasses providing greater stopping power than lower atomic weight gasses.

When a particle having an energy great enough to penetrate through the outer shell 24 and the first interior shell 26 impinges on and penetrates through both the outer shell 24 and the first interior shell 26, contemporaneous current pulses are produced in the groups 36 and 38 of anode wires. If this particle also has enough energy to penetrate the second interior shell 28 and is traveling in a direction that causes it to do so, a current pulse is also induced in the anode wire 31 at approximately the same time.

By counting those current pulses that occur at about the same time in the groups 36 and 38 of anode wires that are not accompanied by a current pulse in the anode wire 31, an estimate of the number of particles having enough energy to penetrate the outer shell 24 and the first interior shell 26 but not to penetrate the second interior shell 28 is realized. Some of the particles that penetrate the outer shell 24 and the first interior shell 26 will miss the second interior shell 28, and these may or may not be particles that have an energy less than would be required to penetrate the second interior shell 28.

When the outer shell 24 and the first interior shell 26 each act as filters capable of stopping particles having an energy of less than about 700 keV and the second interior shell 28 acts as a filter capable of stopping particles having an energy of less than 2.3 MeV, the triple-cell particle detector 12 provides a particle detector that is capable of distinguishing between beta particles having an energy of between 700 keV and 2.3 MeV and other, more energetic particles (e.g., cosmic rays and natural terrestrial radiation) having an energy in excess of 2.3 MeV.

Sr-90 produces yttrium as a breakdown product (Y-90). Y-90 is a beta emitter having a relatively short half life, producing beta particles having an end point energy of 2.3 MeV. These beta particles can penetrate the outer shell 24 and the first interior shell 26 but not the second interior shell 28. The coincidence circuit 64 is capable of distinguishing between signals from these beta particles and signals from particles having energies in excess of 2.3 MeV. As a result, the triple-cell particle detector 12 acts as a detector for Sr-90 that is also relatively insensitive to high energy (i.e., >2.3 MeV) radiation. U-238 produces protactinium as a breakdown product (Pa-234m). Pa-234m also is a beta emitter having a relatively short half life, providing beta rays having end point energies of 2.3 MeV. These events can cause counts on the anode wires 36 and 38 but not on the anode wire 31. As a result, by counting only those events that cause counts on the groups of anode wires 36 and 38 and not on the anode wire 31 during a short interval, such as two to five microseconds, an estimate of the level of radioactivity due to Sr-90 or U-238 or both is possible. The triple cell particle detector 12 is insensitive to gamma rays such as those emitted by Co-60 and Cs-137 due to the low density of molecules in the P-10 counting gas. The stopping power of the counting gas for energetic gamma rays is near zero. The application of a coincidence/anti-coincidence criterion for identifying counts attributable to high-energy beta particles further diminishes the gamma ray sensitivity of the detector.

Long-lived fission and activation products that emit beta particles having end point energies of less than 700 keV can at most only cause counts on the anode wires 38 and not on the anode wires 31 and 36. As a result, the triple-cell particle detector 12 is capable of discriminating between Sr-90 or U-238 and their long-lived fission and activation products.

Other types of sources of radioactivity, such as cosmic rays and natural terrestrial radiation, can provide radiation having energies in excess of 2.3 MeV. These events will typically give rise to counts from the anode wire 31 as well as the groups of anode wires 36 and 38. As a result, the triple-cell particle detector 12 is able to discriminate between these kinds of radioactivity and that due to the presence of Sr-90 or U-238. Because the P-10 counting gas is insensitive to gamma radiation and the combined thickness of the entrance surfaces 24 and 26 of the outer two proportional counters is sufficient to stop beta particles with energies below about 700 keV, Sr-90 and U-238 may be detected by the triple-cell particle detector 12 even when activation and fission products like Co-60 or Cs-137, which emit both beta particles and gamma rays, are present together with Sr-90 or U-238.

In one set of experiments, a test sonde 10 provided a sensitivity of about 1 picoCurie per gram of soil during measurements extending over a ten minute period. A planar version of the triple cell particle detector 12 also provided a sensitivity of about 1 picoCurie per gram of sample during a similar test. A version of the test sonde 10 of FIG. 1 employing O-rings to act as waterproof seals at the ends 14 and 15 was successfully deployed in twenty feet of water.

The triple cell particle detector 12 may be employed to detect underground radionuclides when it is contained in a sonde 10 that is deployed in a borehole. Alternatively, the detector 12 may be used to assay groundwater or to characterize radionuclides in storage facilities or tanks, or in effluent from various kinds of facilities. Broad area surveys may be carried out by truck mounting the multiple cell detector 12 and support circuitry 50 and taking a series of readings over a relatively large geographical area. The system is robust, both mechanically and with respect to environmental variables such as moisture, temperature and the like. The multiple cell detector 12 provides gross beta particle counts in addition to counts of beta particles having energies falling within a band defined by lower and upper energy levels. By integrating beta particle ionization events over a relatively large interior volume, superior sensitivity is realized compared to some other kinds of detectors.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A multiple cell radiation detector comprising:
   a central cell including a first cylindrical wall having a radiation stopping power less than an upper threshold;
   an anode wire suspended along a cylindrical axis of central cell;
   a second cell including a second cylindrical wall having a radiation stopping power greater than a lower threshold, the second cylindrical wall being mounted coaxially outside of the first cylindrical wall, the first and second cylindrical walls having first and second ends;
   a first end cap forming a gas-tight seal at first ends of the first and second cylindrical walls;
   a second end cap forming a gas-tight seal at second ends of the first and second cylindrical walls; and
   a plurality of anode wires suspended between the first and second cylindrical walls.

2. The detector of claim 1 wherein the first and second end caps have stopping powers at least as great as the upper threshold.

3. The detector of claim 1 further comprising:
   a first gas inlet formed in the first end cap; and
   a first valve coupled to the first gas inlet, the first valve being movable between a first position allowing gas to enter into or escape from the detector, and a second position preventing gas from entering into or escaping from the detector.

4. The detector of claim 3 further comprising:
   a second gas inlet formed in the second end cap; and
   a second valve coupled to the second gas inlet, the second valve being movable between a first position allowing gas to enter into or escape from the detector, and a second position preventing gas from entering into or escaping from the detector.

5. The detector of claim 1 wherein the plurality of anode wires are in a group, and wherein the detector further comprises:
   a third cell having a third cylindrical wall providing a stopping power less than another lower threshold, the third cylindrical wall being mounted coaxially outside of the second cylindrical wall;
   a second group of anode wires suspended between the second and third cylindrical walls; and
   wherein the first and second end caps form a gas-tight seal at respective first and second ends of the third cylindrical wall.

6. The detector of claim 5 wherein the lower threshold and the another lower threshold are each about 330 kilo electron volts.

7. The detector of claim 5 wherein:
   the first cylindrical wall is formed from aluminum and has a wall thickness of about one-eighth of an inch; and
   the second and third cylindrical walls are formed from aluminum and each have a wall thickness of about twenty thousandths of an inch.

8. The detector of claim 1 wherein the upper threshold is about 2.3 million electron volts.

9. The detector of claim 1 wherein:
   the first cylindrical wall is formed from aluminum and has a wall thickness of about one-eighth of an inch; and
   the second cylindrical wall is formed from aluminum and has a wall thickness of about twenty thousandths of an inch.

10. A multiple cell radiation detection system comprising:
    a central cell having a first cylindrical wall providing a stopping power less than an upper threshold;
    an anode wire suspended along a cylindrical axis of the central cell;
    a second cell having a second cylindrical wall providing a stopping power greater than a lower threshold, the second cylindrical wall being mounted coaxially outside of the first cylindrical wall;
    a first end cap forming a gas-tight seal at first ends of the first and second cylindrical walls;
    a second end cap forming a gas-tight seal at second ends of the first and second cylindrical walls;
    a first group of anode wires suspended between the first and second cylindrical walls;
    a high voltage power supply having a negative terminal coupled to the first and second cylindrical walls and having a positive terminal;
    a first preamplifier having a high voltage input coupled to the positive terminal, a first output and a first signal input coupled to the anode wire and providing a voltage from the positive terminal to the anode wire;

a second preamplifier having a high voltage input coupled to the positive terminal, a second output and a second signal input coupled to the first group of anode wires and providing a voltage from the positive terminal to the first group of anode wires; and a counter providing a count of events from the second output that are not contemporaneous with events from the first output.

11. The detection system of claim 10 further comprising:
a first gas inlet formed in the first end cap; and
a first valve coupled to the first gas inlet, the first valve allowing gas to enter the detector in a first position and preventing gas from entering into or escaping from the detector in a second position.

12. The detection system of claim 10 wherein the upper threshold is about 2.3 million electron volts.

13. The detection system of claim 10 further comprising:
a third cell having a third cylindrical wall having a stopping power less than another lower threshold, the third cylindrical wall being mounted coaxially outside of the second cylindrical wall;
a second group of anode wires suspended between the second and third cylindrical walls; and
a third preamplifier having a high voltage input coupled to the positive terminal, a third output and a third signal input coupled to the second group of anode wires and providing a voltage from the positive terminal to the second group of anode wires, wherein the counter is configured to provide a count of contemporaneous events from the second and third outputs that are not accompanied by events from the first output, and wherein the first and second end caps form a gas-tight seal at respective first and second ends of the third cylindrical wall.

14. A submersible sonde including:
a cylindrical external housing having an outer diameter capable of fitting into a borehole, a lower conical end cap having a point and a base, the base coupled to a first end of the cylindrical housing, the cylindrical housing having an upper end cap including an eye capable of supporting the sonde from a cable and also including a water-tight seal for an electronic cable;
a first compartment formed within the housing above the first end of the housing, the first compartment containing a multiple cell radiation detector having n many cells, a first cell of the detector having a first detection threshold for detection of ionizing radiation, a second cell of the detector having a second detection threshold for detection of ionizing radiation, the second threshold being lower than the first threshold; and a second compartment formed within the housing above the first compartment, the second compartment including a high voltage power supply having a negative electrode coupled to the external housing and a positive electrode, the second compartment also including a plurality of preamplifiers each having a high voltage input coupled to the positive electrode, a first of the preamplifiers including a signal input coupled to an anode of the first cell and an output, a second of the preamplifiers including a signal input coupled to an anode of the second cell and an output.

15. The sonde of claim 14, wherein the first cell comprises:
a first cylindrical wall having a stopping power equal to the first threshold; and
an anode wire suspended along a cylindrical axis of the first cylindrical wall.

16. The sonde of claim 15, wherein the second cell comprises:
a second cylindrical wall having a stopping power equal to the second threshold, the second cylindrical wall being mounted coaxially outside the first cylindrical wall and forming a first cavity between the first cylindrical wall and the second cylindrical wall;
a first end cap forming a seal at first ends of the first and second cylindrical walls;
a second end cap forming a seal at second ends of the first and second cylindrical walls; and
a first group of anode wires each extending from the first end cap to the second end cap through the first cavity, each of the anode wires of the first group being insulated from the first and second end caps and from the first and second cylindrical walls.

17. The sonde of claim 16, further including a third cell comprising:
a third cylindrical wall having a stopping power equal to a third threshold, the third cylindrical wall being mounted coaxially outside the second cylindrical wall and forming a second cavity therebetween, the first and second end caps forming seals at first and second ends of the third cylindrical wall; and
a second group of anode wires each extending from the first end cap to the second end cap through the second cavity, each of the anode wires of the second group being insulated from the first and second end caps and from the second and third cylindrical walls.

18. A method of detecting radiation, the method comprising:
providing first cylindrical wall with a stopping power less than an upper threshold, the cylindrical wall having a cylindrical axis;
suspending an anode wire along the cylindrical axis of the cylindrical wall; providing a second cylindrical wall with a stopping power greater than a lower threshold, and mounting the second cylindrical wall coaxially outside of the first cylindrical wall; suspending a plurality of anode wires between the first and second cylindrical walls; forming a gas-tight seal at first ends of the first and second cylindrical walls; and
forming a gas-tight seal at second ends of the first and second cylindrical walls.

19. The method of claim 18, further comprising:
coupling a high voltage power supply to the anode wire and to the plurality of anode wires; and
detecting current pulses in the group of anode wires that are not coincident with current pulses in the anode wire.

20. The method of claim 18, further comprising filling cavities within the first and second cylindrical walls with a detection gas comprising a mixture of a noble gas and a hydrocarbon.

21. The method of claim 18, further comprising filling cavities within the first and second cylindrical walls with a mixture of argon and methane.

* * * * *